United States Patent [19]

Matich

[11] Patent Number: 5,018,397
[45] Date of Patent: May 28, 1991

[54] TRANSDUCER INPUT SHAFT LOCK MECHANISM

[75] Inventor: Charles B. Matich, Seattle, Wash.

[73] Assignee: The Boeing Company, Seattle, Wash.

[21] Appl. No.: 470,928

[22] Filed: Jan. 26, 1990

[51] Int. Cl.⁵ .............................................. G01D 5/00
[52] U.S. Cl. .................................. 73/866.5; 248/544; 248/27.1; 33/1 PT
[58] Field of Search ............... 248/544, 682, 548, 551, 248/27.1, 674, 680, 222.1; 70/182, 183; 250/231.13; 73/1 E; 361/300; 411/150; 33/1 PT

[56] References Cited

U.S. PATENT DOCUMENTS

| | | | |
|---|---|---|---|
| 158,962 | 1/1875 | Miller | 411/150 |
| 320,270 | 6/1885 | Mitchell | 411/150 |
| 4,474,047 | 10/1984 | Carlson | 33/1 PT |
| 4,601,378 | 7/1986 | Pierce | 248/674 |

FOREIGN PATENT DOCUMENTS 56-53561  5/1981  Japan .................................. 248/674

*Primary Examiner*—David L. Talbott
*Assistant Examiner*—Robert A. Olson
*Attorney, Agent, or Firm*—Delbert J. Barnard

[57] ABSTRACT

A detent capture (26) is connected to the input shaft (16) of a position indicating transducer (10). A pair of leaf spring detents (24) are carried by a mounting base portion (14) of transducer (10). The leaf spring transducers (24) have at-rest positions in which they are received in, and interlock with, recesses (64, 66) formed in the detent capture (26). The leaf spring detents (24) serve to couple the detent capture (26), and hence the input shaft (16), to the transducer housing (12). This coupling occurs at a predetermined position in which the input shaft (16) is properly indexed to the electrical output of the transducer (10). The leaf spring detents (24) have outer end portions which contact a mounting member (22) as the transducer (10) is being installed onto the mounting member (22). This contact, and the movement of the transducer (10) into position on the mounting member (22), disengages the leaf spring detents (24) from the detent capture (26), freeing the input shaft (16) for rotation when the transducer (10) is mounted.

12 Claims, 4 Drawing Sheets

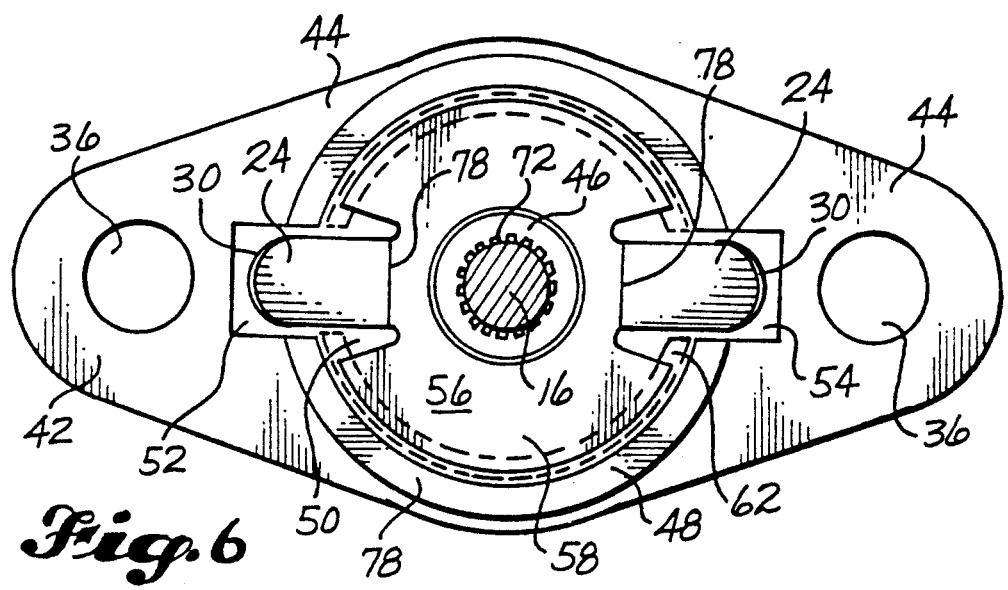
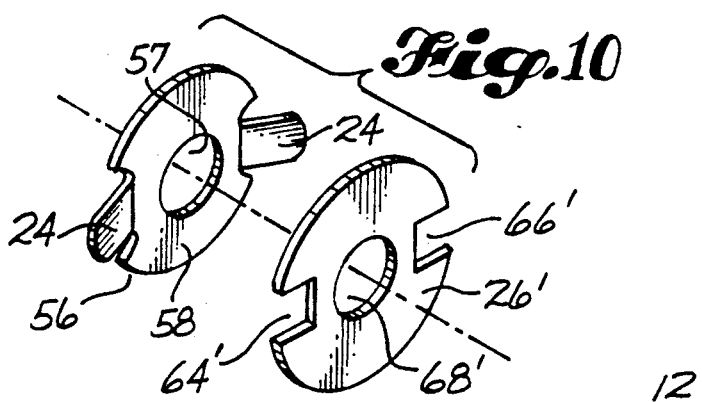
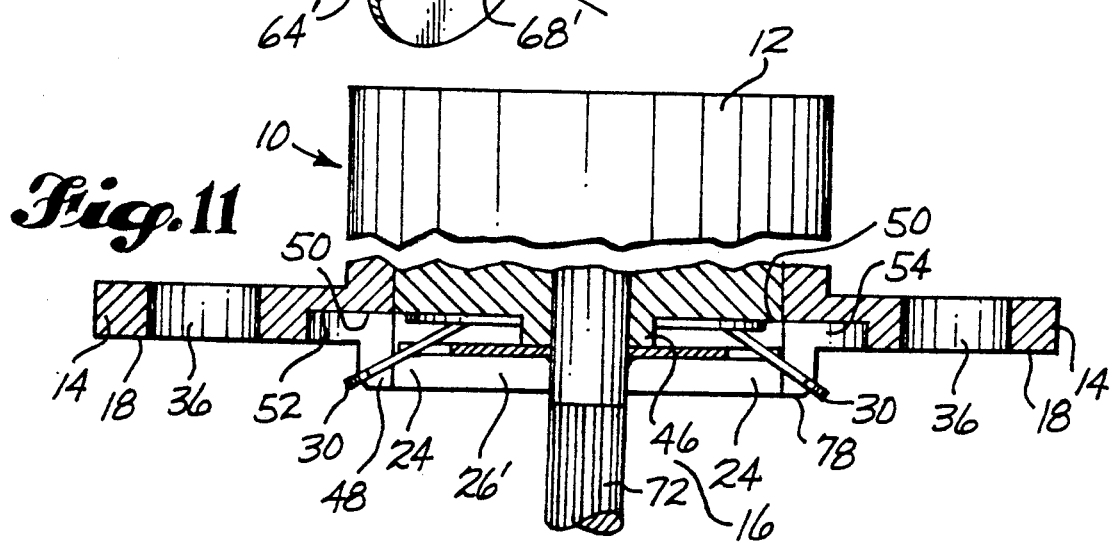

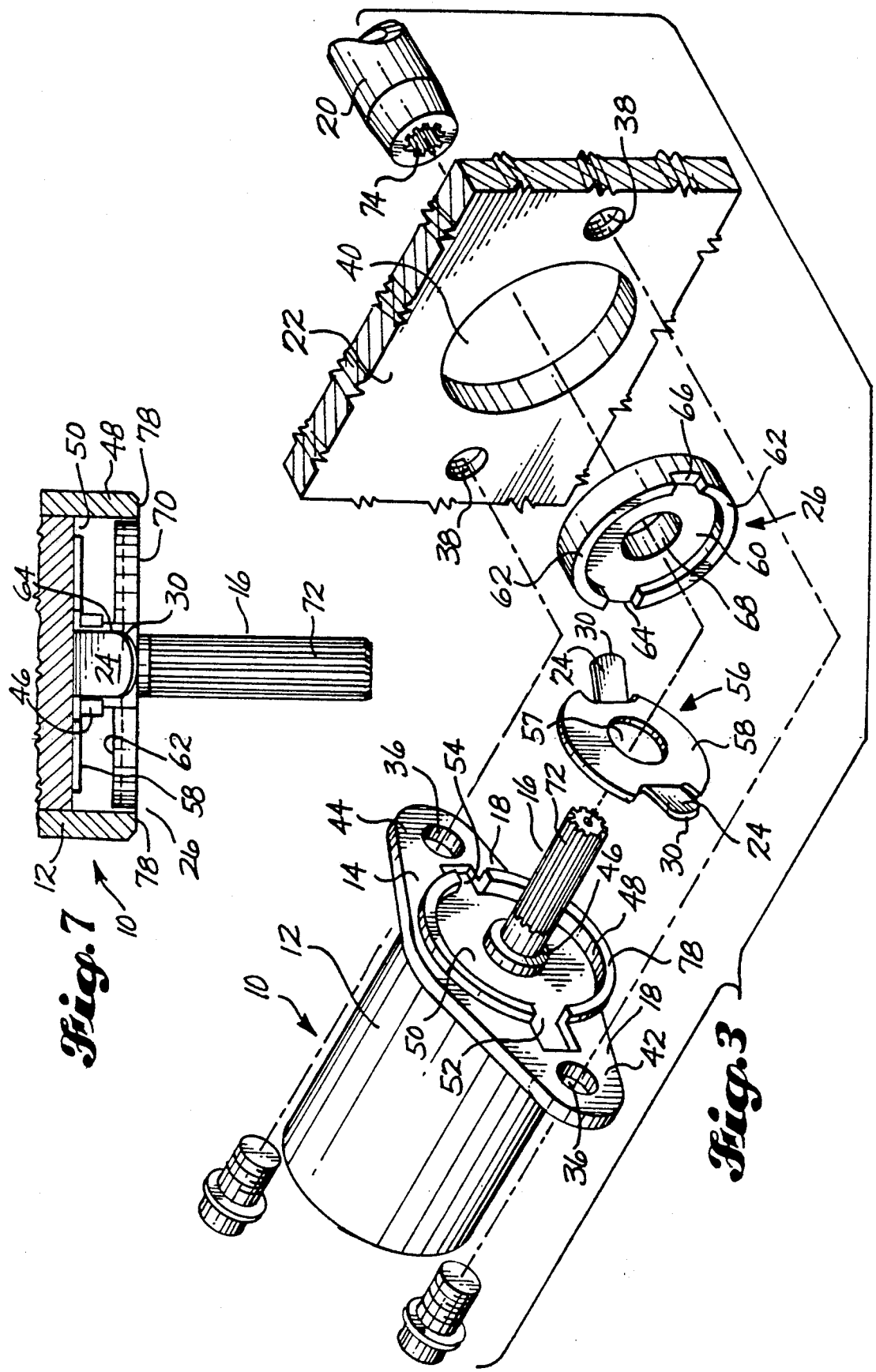

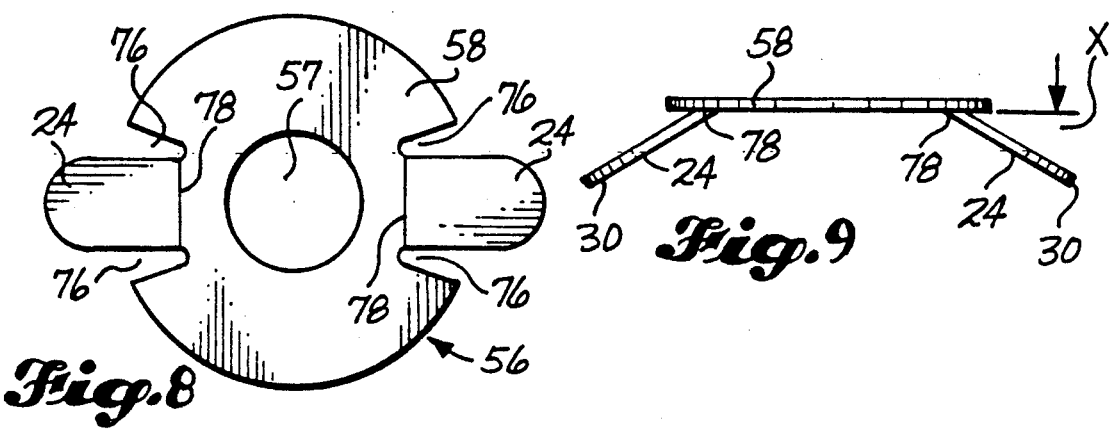
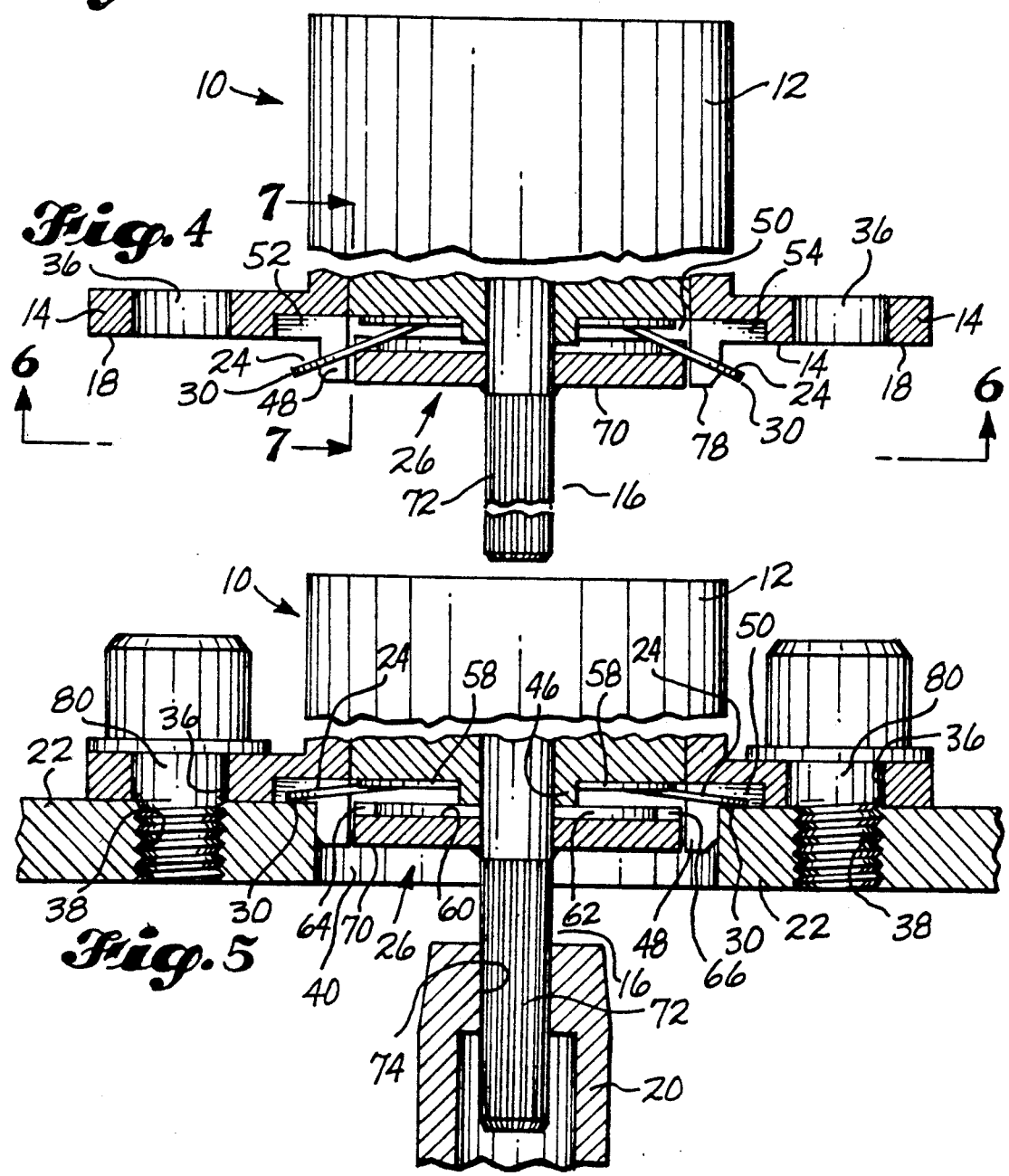

TRANSDUCER INPUT SHAFT LOCK MECHANISM

TECHNICAL FIELD

This invention relates to position indicating transducers of a type which generate an electrical signal indicative of the angular position of a member to which an input shaft of the transducer is connected. More particularly, the present invention relates to the provision of an improved position indicating transducer which includes a lock mechanism for locking the input shaft into an indexing position when the transducer is not installed, but which is automatically unlocked by an axial movement of the transducer during the final stages of mounting the transducer to a mounting member, with its input shaft coupled to a rotatable member whose position is to be monitored by the transducer.

BACKGROUND INFORMATION

The position indicating transducer of the present invention was specifically developed for use aboard aircraft, for monitoring the position of wing flap or other member. However, it is believed that the transducer has a more general utility in other installations. Therefore, even though reference will be made herein to an aircraft use of the invention, for purposes of describing the invention and its use, it is to be understood that the invention is not limited to aircraft use.

In an aircraft environment, typical position transducers which are used to monitor the position of a control surface or other component of the aircraft include position transmitters, synchros, resolvers, RVTD's (Rotary Variable Differential Transformers). Each of these position transducers produces an electrical signal (usually voltage) that is related (usually proportionally) to the position of their input shafts. This electrical output is used by flight control computers for flight deck indication and for feedback control of the system(s) involved. When not installed in the drive system of the aircraft, these transducers must have their input shafts locked in a specific position to insure that, at installation time, the transducer output will be synchronized to the position of the member to which the transducer is to be connected and whose position it is to monitor.

Various methods have been devised to accomplish the shaft retention described above. These include using lockwire or "rig pins". But, in all cases, the looking component must be removed before the transducer can be installed and coupled to the member whose position it is to monitor. With no input shaft restraint, the correct installation position of the transducer input shaft must be verified electrically prior to installation. This is done by measuring the output voltage of the transducer and comparing it to the voltage required for installation. If incorrect, the input shaft must be rotated until the correct voltage reading is achieved. The transducer is then installed. This process can require several iterations depending on the sensitivity of the transducer and the skill of the aircraft or factory personnel performing the installation.

The principal object of the present invention is to provide a sure and simple shaft-lock addition to the transducer of a type which eliminates the time consuming and error prone removal and adjustment process which has in the past been used. An object of the present invention is to provide a transducer with a lock device which effectively looks the input shaft of the transducer into a synchronized position up until the transducer is mounted and which becomes unlocked, freeing the input shaft for rotation with the member to which it is coupled, in response to the transducer being moved onto its mounting member as a latter stage step of the mounting operation.

DISCLOSURE OF THE INVENTION

A transducer constructed according to the present invention is basically characterized by a housing which includes a mounting base having a base surface within a substantially radial plane. A rotary input shaft projects from the mounting base end of the housing and, in use, is connectable to a rotatable member when the transducer is mounted with its base surface against a mounting member. The transducer includes means within the housing for producing an electrical output signal related to the angular position of the input shaft. The transducer includes a mechanism for locking the input shaft into an indexing position when the transducer is not installed to insure that, at installation time, the transducer output will be synchronized to the position of the rotatable member to which the rotary input shaft is to be connected. The locking mechanism comprises a leaf spring detent which is carried by the housing and includes a fixed inner end positioned radially between the input shaft and the base surface. The leaf spring detent also includes a free outer end which is positioned radially inwardly adjacent the base surface. The leaf spring detent has an at rest position in which it deflects axially outwardly from the mounting base of the transducer housing as it extends radially outwardly from its fixed inner end to its free outer end. When the leaf spring detent is in its at rest position, the free outer end of the leaf spring detent is spaced axially outwardly from the radial plane of the base surface. According to the invention, a detent capture is secured to the input shaft. The detent capture is rotatable with the input shaft and includes a lock component constructed and positioned to interfit with an intermediate portion of the leaf spring detent when the leaf spring detent is in its at rest position. This interfit of the detent capture and the leaf spring detent functions to lock the input shaft against rotation relative to the transducer housing. The leaf spring detent has an outer end portion when projects radially outwardly from the lock component of the detent capture and axially outwardly from the plane of the base surface. This places the outer end portion of the leaf spring detent into a position for contact with the mounting member as the mounting base is being placed on the mounting member. This contact bends the leaf spring detent towards the mounting base of the transducer housing and disengages the leaf spring detent from the lock component of the detent capture, to in that manner free the detent capture and the input shaft for rotation.

In preferred form, the leaf spring detent is a portion of a plate member which includes a substantially planar base which is contiguous the mounting base of the housing and the leaf spring detent is a bent radial extension of the substantially planar base. The mounting base of the transducer housing may include a boss which surrounds the input shaft and the plate member may be in the nature of a washer and include an opening into which the boss extends. The transducer may comprise a pair of leaf spring detents of the character described, spaced 180° apart, and the detent capture may include a pair of locked components of the character described, one for each leaf spring detent.

In preferred form, the lock component is a recess in the detent capture sized to snugly receive the intermediate portion of the leaf spring detent. The detent capture may be in the form of a disk having an inner face directed towards the mounting base of the housing, a boss at the periphery of the inner face, and the recess may be a radial channel formed in the boss.

In preferred form, the mounting base of the transducer housing includes a cavity which surrounds the input shaft, axially inwardly of the plane in which the base surface of the mounting base is situated. The fixed inner end of the leaf spring detent is located within the cavity. When the leaf spring detent is in its at rest position, the outer end portion of the leaf spring detent is positioned axially outwardly of the cavity. When the transducer is mounted, the contact which occurs between the outer end portion of the leaf spring detent and the mounting member bends the outer end portion of the leaf spring detent into the cavity.

The present invention includes a recognition of a need to lock the input shaft into a nonrotating position and maintaining it locked to prevent rotation until the transducer is substantially mounted. Another part of the invention is the recognition of the desirability that unlocking of the input shaft of the transducer occur in response to mounting placement of the transducer housing on the mounting member.

An object of the present invention is to provide a shaft-lock attachment to a transducer which keeps the input shaft of the transducer locked in a desired predetermined position until the transducer is substantially in place on its mounting with its input shaft coupled to a rotatable member whose angular position the transducer is to monitor.

Another object of the invention is to provide such a lock mechanism which can be easily reset to properly position the input shaft of the transducer following a removal of the transducer from its mounting.

A further object of the invention is to provide a shaft lock for a transducer which is simple in construction, is durable in use, is efficient in operation, and which can be economically manufactured.

Other objects, advantages and features of the invention will be hereinafter described in connection with, or will be apparent from, the description of the preferred embodiment or best mode, the appended claims and the annexed drawings.

BRIEF DESCRIPTION OF THE DRAWINGS

In the drawings, like reference characters designate like parts throughout the several views.

FIG. 3 is a bent axis exploded pictorial view of a preferred embodiment of the invention;

FIG. 4 is a view generally like FIG. 1, but of the preferred embodiment;

FIG. 5 is a view generally like FIG. 2, but of the preferred embodiment;

FIG. 6 is a sectional view of the preferred embodiment, taken substantially along line 6—6 of FIG. 4, and showing the transducer in bottom plan with a portion of the detent capture shown in phantom line;

FIG. 7 is a fragmentary axial sectional view taken substantially along line 7—7 of FIG. 4, with some parts in elevation;

FIG. 8 is a top plan view of the leaf spring detent member which is a part of the preferred embodiment;

FIG. 9 is an elevational view of the leaf spring detent member shown by FIG. 8;

FIG. 10 is an exploded pictorial view of the leaf spring detent member and a second form of detent capture member; and FIG. 11 is a view like FIG. 4, but showing the leaf spring detents engaged by the leaf spring capture member that is shown in FIG. 10.

BEST MODE FOR CARRYING OUT THE INVENTION

Figure 1:
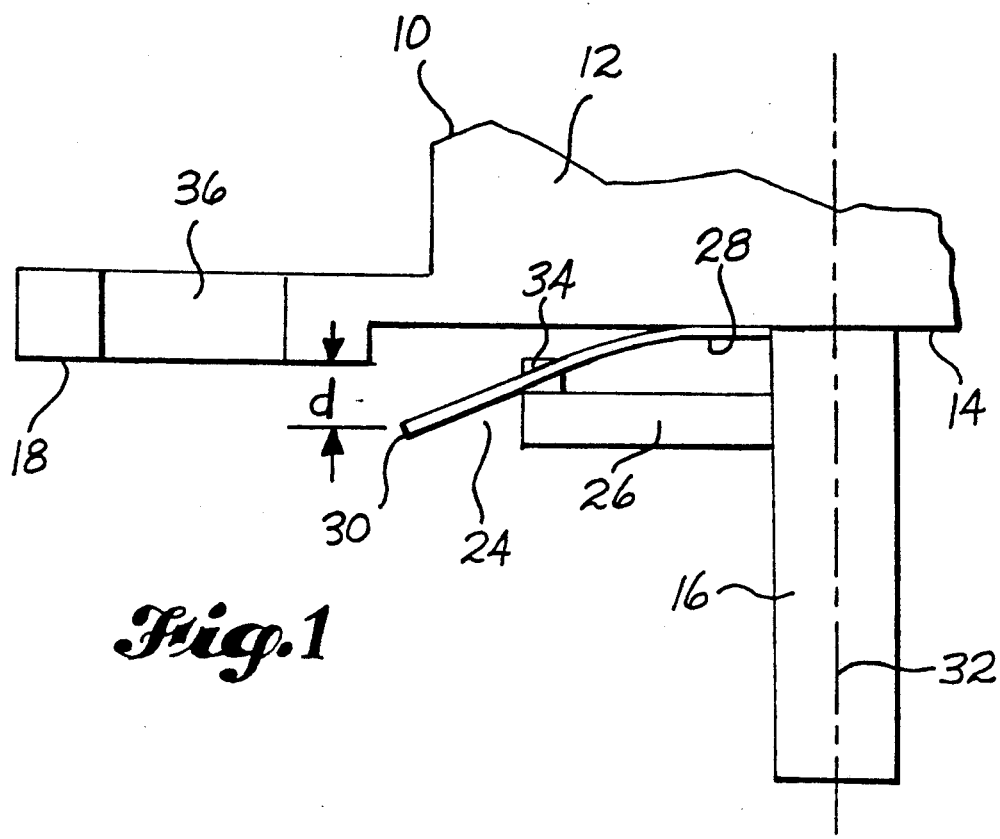
FIG. 1 is a diagrammatic view, partially in longitudinal section and partially in elevation, of the basic elements and relationships of the invention, such view showing a leaf spring detent that is anchored on the transducer housing and in locking engagement with a detent capture that is secured to and is rotatable the input shaft of the transducer.
Figure 2:
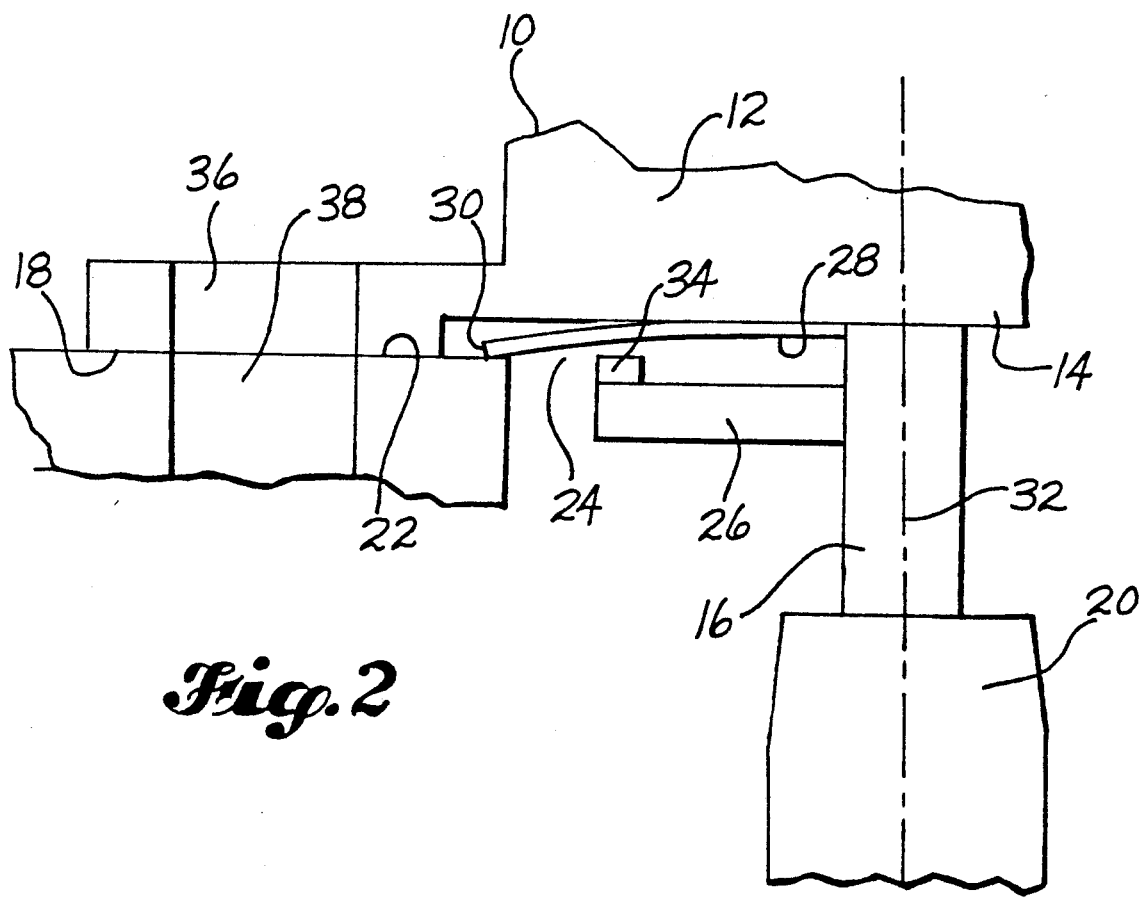
FIG. 2 is a view like FIG. 1, but showing the transducer mounted and showing the leaf spring detent moved by contact with a mounting member out of locking engagement with the detent capture, the detent capture and the input shaft for rotation.

FIGS. 1 and 2 diagramatically illustrate the basic elements and relationships which characterize the invention. The transducer 10 includes a housing 12 having a mounting base 14 from which an input shaft 16 projects. The mounting base 14 includes a flat base surface 18 within a substantially radial plane. The rotary input shaft 16 is in use connectable to a rotatable member 20 when the transducer 10 is mounted and the base surface 18 is against a mounting member 22 (FIG. 2).

In basic form, the mechanism for locking the input shaft 16 into a predetermined fixed position relative to the housing 12 comprises a leaf spring detent 24 that is carried by the housing 12 and is restrained against rotation, and a detent capture 26 that is secured to and rotatable with the input shaft 16. In preferred form, the leaf spring detent 24 includes an inner end 28 that is positioned radially between the input shaft 16 and the base surface 18 and a free outer end 30 which is positioned radially inwardly adjacent the base surface 18. As clearly shown by FIG. 1, the leaf spring detent 24 has an at-rest position in which it deflects axially outwardly from the mounting base 14 as it extends radially outwardly from its inner end 28 to its free outer end 30. When the leaf spring detent 24 is in its at-rest position, its free outer end 30 is spaced axially outwardly from the radial plane of the base surface 18, a distance d. The detent capture 26 may be in the nature of a radially extending arm or plate having a suitable lock component 34 at its outer radial boundary which is constructed and positioned to interfit or interlock with an intermediate portion of the leaf spring detent 24 when the leaf spring detent 24 is in its at-rest position. This engagement of the leaf spring detent 24 and the detent capture 26 serves to lock the input shaft 16 against rotation relative to the transducer housing 12. This happens because the leaf spring detent 24 is fixed in position relative to the housing 12. It can bend or flex like a cantilever beam towards and away from the mounting base 14, but it is restrained against other types of movement, including rotational movement about axis 32. Accordingly, the engagement of the intermediate portion of leaf spring detent 24 and the lock component 34 causes the detent capture 26 and the input shaft 16 to which it is connected to also be held or restrained against rotation about axis 32.

Owing to the above described construction and relative positioning of base surface 18, the free outer end portion 30 of leaf spring detent 24, and the mounting member 22, there will be an automatic disengagement or unlocking of the leaf spring detent 24 from the detent capture 26 as the transducer housing 12 is installed onto the mounting member 22. In preferred form, the mounting base 14 of transducer housing 12 includes a plurality of fastener receiving openings 36 which are, during the mounting process, placed into registry with similar openings 38 in the mounting member 22. As is shown by FIG. 2, when the transducer housing 12 is moved axially towards the mounting member 22, with its opening 36 in its mounting base 14 in substantial alignment with opening 38 in mounting member 22, the outer end portion 30 of leaf spring detent 24 makes contact with mounting member 22 as soon as surface 18 is the distance d away from mounting member 22. Additional movement of the housing 12 towards the mounting member 22 results in a straightening type bending of the leaf spring detent 24. The various parts are so dimensioned that when mounting surface 18 is against mounting member 22, the contact of end portion 30 of leaf spring detent 24 with mounting member 22 has straightened the leaf spring detent 24 a sufficient amount to move the intermediate portion of the leaf spring detent 24 out from a locking engagement with the lock component 34. This is clearly shown by FIG. 2. When the leaf spring detent 24 and the lock component are apart, the detent capture 26 and the input shaft 16 are free for rotation.

As stated above, the unlocking of the input shaft 16 from the transducer housing 12 is done substantially automatically, as a part of the process of mounting the transducer 10 onto the mounting member 22. The shaft lock mechanism, composed of the leaf spring detent 24 and the detent capture 26, lock the input shaft 16 in a proper position relative to the mounting openings 36. Preparatory to installation of the transducer 10, the rotatable member 20 is moved into a position of proper registry with the locked position of the shaft 16. Mounting of the transducer is performed quickly and without regard to the positioning of the input shaft 16 because such positioning is established by the lock mechanism. The free end of the input shaft 16 is aligned with a receiving opening or socket within the rotatable member 20 and at the same time the openings 36 are aligned with the openings 38. The transducer is moved axially until input shaft 16 is within the socket in rotatable member 20 and the mounting surface 18 is against the mounting member 22. Fasteners are inserted through the openings 36, 38 and are rotated for securing the mounting base 14 to the mounting member 22. When the fasteners are installed, the input shaft 16 is in proper registry with the rotatable member 20 and is unlocked from the transducer housing 12 so that it can rotate in position whenever the rotatable member 20 rotates.

Reference will now be made to FIGS. 3-8 which illustrate a preferred embodiment of the invention. Referring first to FIG. 3, the mounting member 22 is shown to include a pair of spaced apart fastener receiving openings 38 between which is positioned a large opening 40. Transducer housing 12 is shown to be cylindrical in form and the mounting base 14 is shown to comprise a pair of diametrically opposite ears 42, 44, each of which extends radially outwardly from a central base portion of the housing 12. In preferred form, the central base portion of the housing 12 includes a first small diameter annular boss 46 which closely surrounds the input shaft 16, a much larger outer annular boss 48, and an annular end cavity or recess 50. As shown by FIGS. 3-5, the end cavity 50 extends into the mounting base 14 such that the inner surface of boss 48 has a greater axial length than the outer surface of boss 48. The end cavity 50 is extended radially outwardly to form pockets at 52, 54. Cavity portions 52, 54 extend through the boss 48 at diametrically opposed locations which are in a straight line with the fastener receiving openings 36 (FIG. 6).

In preferred form, two leaf spring detents 24 are utilized and they are diametrically oppositely extending, ear-like portions of a plate member 56 which is in the nature of a washer. Plate member 56 includes a central opening 57, a central planar base portion 58, and a pair of leaf spring detents 24 extending radially outwardly from the base portion 58. Each leaf spring detent 54 is in the nature of a bent radial extension of the base portion 58.

In preferred form, the detent capture 26 is in the nature of a disk formed to include a recess or cavity 60 on its inner side. The recess 60 is substantially surrounded by a boss 62 which is machined or otherwise formed at 64 and 66 to form recesses into which the leaf spring detents 24 are snugly received. These recesses 64, 66 each constitutes one form of a lock component for the detent capture 26. In preferred form, the detent capture 26 includes a central opening 68 and a substantially planar outer side surface 70 (FIG. 7). By way of typical and therefore nonlimitative example, the input shaft 16 may include a plurality of axial splines 72 which are sized to be snugly received within axially extending grooves 74 which are formed within the axial opening or socket in rotatable member 20. The complementary splines and grooves 72, 74 make a close tolerance fit.

As shown by FIGS. 8 and 9, the washer-like member 56 may be cut out from a piece of material which is initially flat. The material is initially out to form the opening 57, the ear-like extensions which ultimately become the leaf spring detents 24, and cut out regions 76 on opposite sides of the ears. The ears 24 are then bent along chord lines 78, such lines in effect becoming hinge lines. The leaf spring detents 24 each extend radially outwardly, in a cantilever fashion, from its hinge line 78. By way of typical and therefore nonlimitative example, the deflection angle X of each detent 24 may be about 30°, as indicated in FIG. 9.

As shown by FIGS. 4 and 7, in preferred form, the outer face 70 of detent capture 26 is substantially coplanar with the radial end surface 78 of boss 48. The at-rest position of the two leaf spring detents 24 locates intermediate portions of these detents 24 within the recesses 64, 66 (FIG. 3) which form the lock components of the detent capture 26. At the same time, the outer end portions 30 of the leaf spring detents 24 are positioned radially outwardly from the outer periphery of boss 48 and are spaced axially outwardly from mounting surface 18. The intermediate portions of the leaf spring detents 24 make a snug fit within the recesses 52, 54 (FIG. 6). This interfit of leaf spring detents 24 within the recesses 52, 54 by itself prevents rotation of plate member 56 relative to the transducer housing 12. The thus held against rotation detents 24 serve to hold the detent catch 26 against rotation, so long as the intermediate portions of detents 24 are within the recesses 64, 66 (FIG. 4).

When the transducer 10 is in the condition shown by FIG. 4, the outer end portions 30 of the leaf spring detents 24 each project a short distance radially outwardly from the boss 48. The detent capture 26 and the rest of the detent member 56 are substantially enclosed within and by the recess 50. As shown by FIG. 5, in preferred form, the opening 40 in mounting member 22 is preferably sized to rather snugly receive the outer diameter of the boss 48.

The preferred embodiment of transducer 10 is installed in the following manner. The annular flange or boss 48 is positioned into registry with opening 40 and at the same time the fastener receiving openings 36 are put into substantial alignment with the fastener receiving openings 38. Then, the transducer 10 is moved endwise, to insert the boss 48 into the opening 40 and position mounting surface 18 against mounting member 22, with the boss 48 essentially piloting the transducer into position. The fastener elements or cap screws 80 may be inserted through the openings 36 and partially screwed into the openings 38 before the transducer 10 is moved endwise an amount sufficient to cause an unlocking of the shaft 16 from the housing 12. As previously described, the unlocking occurs substantially automatically as the housing 12 is being mounted onto the mounting member 22. The fasteners 80 hold the housing 12 in a proper angular orientation relative to member 22. As fasteners 80 are tightened, and/or as housing 12 moves towards member 22, a contact occurs between the outer end portions 30 of the leaf spring detents 24 and the mounting member 22. This contact pushes the leaf spring detents 24 axially inwardly into the recess pockets 52, 54. When mounting surface 18 is against mounting member 22, the leaf spring detents 24 are disengaged from the lock components 64, 66 (FIG. 5). This frees the detent capture 26 and the input shaft 16 for rotation in response to a rotation of the member 20.

The input shaft 16 remains free to rotate so long as transducer 10 remains mounted on the member 22. However, as should be appreciated, whenever the fasteners 80 are removed, and the transducer 10 is lifted off of the mounting member 22, the leaf spring detents 24 will want to resume their at-rest positions, i.e. the positions they occupy in FIG. 4. The outer end portions 30 of leaf spring detents 24 always remain within the pockets 52, 54. For this reason, the plate member 56 is always restrained against rotation and always occupies a proper angular position or orientation relative to the transducer 10. Following a removal of the transducer 10 from the mounting member 22, it may be necessary to rotate shaft 16 until the recesses 64, 66 are once again in registry with the leaf spring detents 24.

FIGS. 10 and 11 illustrate a modified embodiment of the invention. In this embodiment, a thinner detent capture member 26' is used. In this embodiment, the recesses 64', 66' which receive and hold the leaf spring detents 24 are simple square cut radial recesses into the member 26', as is illustrated. FIG. 11 shows the intermediate portions of the leaf spring detents 24 within the recesses 64', 66'. In other respects, the transducer 10 is identical to the transducer shown by FIGS. 3-9.

The internal workings of the transducer 10 are not a part of this invention except to the extent that the transducer 10 provides an electrical output signal which is indicative of the angular position of the input shaft 16. In a typical embodiment, the transducer 10 may be connected to a rotatable member 20 which is a portion of a shaft that is connected to a wing flap. The transducer 10 is used to provide a position indicating signal which informs a flight control computer of the particular position of the wing flap. The present invention enables the wing flap to be set into a predetermined position, followed by an installation of the transducer 10 onto the mounting member 22, with the input shaft 16 of the transducer 10 engaging the grooved opening 74 within the shaft 20 that is connected to the wing flap. This simple operation properly indexes the output signal of the transducer 10 with the wing flap position, with electrical calibration testing of the type that is usually employed being unnecessary.

From the foregoing, various further modifications, component arrangements, and modes of utilization of the invention will be apparent to those skilled in the art to which the invention is addressed. The scope of protection is not to be limited by the details of the embodiments which have been illustrated and described. Rather, the scope of protection is to be determined by the appended claims, interpreted in accordance with the established rules of patent claim interpretation, including use of the doctrine of equivalents.

What is claimed is:

1. A transducer connectable to a rotatable member for generating an electrical signal indicative of the angular position of such member, said transducer comprising:

a housing including a mounting base having a base surface within a substantially radial plane;

a rotary input shaft projecting from said mounting base and in use being connectable to a rotatable member when said transducer is mounted with said base surface against a mounting member; and means within said housing for producing an electrical output signal related to the angular position of the input shaft; and an improvement in the nature of a mechanism for locking the input shaft into an indexing position when the transducer is not installed to insure that, at installation time, the transducer output will be synchronized to the position of the rotatable member, said mechanism comprising:

a leaf spring detent carried by said housing and having a fixed inner end positioned radially between said input shaft and said base surface, and a free outer end positioned radially inwardly adjacent the base surface, said leaf spring detent having an at-rest position in which it deflects axially outwardly from the mounting base of the housing as it extends radially outwardly from its fixed inner end to its free outer end, and in said at-rest position the free outer end of the leaf spring detent is spaced axially outwardly from the radial plane of the base surface; and a detent capture secured to the input shaft, said detent capture being rotatable with the input shaft and having a lock component constructed and positioned to interfit with an intermediate portion of the leaf spring detent when said leaf spring detent is in its at-rest position, for locking the detent capture and the input shaft against rotation relative to the leaf spring detent and the housing; and wherein said free outer end of said leaf spring detent projects radially outwardly from the lock component of the detent capture and axially outwardly from the plane of the base surface, into a position for contact with the mounting member, such contact being made as the mounting base is placed on the mounting member, and such contact bending the leaf spring detent towards the mounting base of the transducer housing and disengaging the leaf spring detent from the lock component of the detent capture, to in that manner free the detent capture and the input shaft for rotation.

2. A transducer according to claim 1, wherein the leaf spring detent is a portion of a plate member which includes a substantially planar base which is contiguous to the mounting base of the housing, and said leaf spring detent is a bent radial extension of said substantially planar base.

3. A transducer according to claim 2, wherein the mounting base of the transducer housing includes a boss surrounding the input shaft and said plate member is in the nature of a washer and includes an opening into which said boss extends.

4. A transducer according to claim 1, comprising a pair of said leaf spring detents, spaced 180° apart, and wherein said detent capture includes a pair of said lock components, one for each leaf spring detent.

5. A transducer according to claim 4, wherein said leaf spring detents are portions of a plate member having a base portion which is contiguous to the mounting base of the housing, and said leaf spring detents are bent radial extensions of said base portion.

6. A transducer according to claim 1, wherein the lock component is a recess in the detent capture sized to snugly receive the intermediate portion of the leaf spring detent.

7. A transducer according to claim 6, wherein said detent capture is a disk having an inner face directed toward the mounting base of the housing, and a boss at the periphery of said inner face, and said recess is a radial channel formed in said boss.

8. A transducer according to claim 1, wherein said mounting base includes an end cavity which surrounds said input shaft, and which extends axially inwardly from the plane of the base surface, and wherein the inner end of the leaf spring detent is located within said cavity, and wherein when the leaf spring detent is in its at-rest position, the outer end portion of the leaf spring detent is positioned axially outwardly of said cavity.

9. A transducer according to claim 8, wherein said cavity is radially outwardly bounded by a boss which projects axially outwardly from the plane of the base surface, and said cavity includes a radially outwardly extending pocket which extends through the boss and includes side portions between which the lead spring detent is received.

10. A transducer according to claim 9, wherein the cavity pocket extends radially outwardly from the boss and wherein the outer end portion of the leaf spring detent is within said pocket when the transducer is mounted and the mounting surface is against the mounting member.

11. A transducer according to claim 10, comprising a pair of said leaf spring detents, spaced 180° apart, and wherein said detent capture includes a pair of said lock components, one for each leaf spring detent, and said cavity includes a radially extending pocket for each leaf spring detent.

12. A transducer according to claim 11, wherein the detent capture is a disk positioned within said end cavity, said disk having an inner face directed towards the mounting base of the housing, and a boss at the periphery of said inner face, said boss including a radial channel for each leaf spring detent which constitutes the lock component which interfits with the intermediate portion of the leaf spring detent.

* * * * *

UNITED STATES PATENT AND TRADEMARK OFFICE
CERTIFICATE OF CORRECTION

PATENT NO.   : 5,018,397
DATED        : May 28, 1991
INVENTOR(S)  : Charles B. Matich It is certified that error appears in the above-identified patent and that said Letters Patent is hereby corrected as shown below:

Col. 1, line 48, "looking" should be -- locking --.

Col. 1, line 68, "looks" should be -- locks --.

Col. 3, line 60, after "rotatable", insert -- with --.

Col. 3, line 65, after "capture", insert -- freeing --.

Col. 6, lines 21 and 22, "detent 54" should be -- detent 24 --.

Col. 6, line 42, "out" should be -- cut --.

Claim 9, col. 10, line 16, "lead" should be -- leaf --.

Signed and Sealed this

Seventeenth Day of November, 1992

*Attest:*

DOUGLAS B. COMER

*Attesting Officer*   Acting Commissioner of Patents and Trademarks